June 21, 1927.

C. B. EVANS

RESILIENT WHEEL

Filed Oct. 10, 1925

Chas. B. Evans
INVENTOR

BY Milo B. Stevens
ATTORNEY

June 21, 1927.
C. B. EVANS
1,633,522
RESILIENT WHEEL
Filed Oct. 10, 1925   2 Sheets-Sheet 2
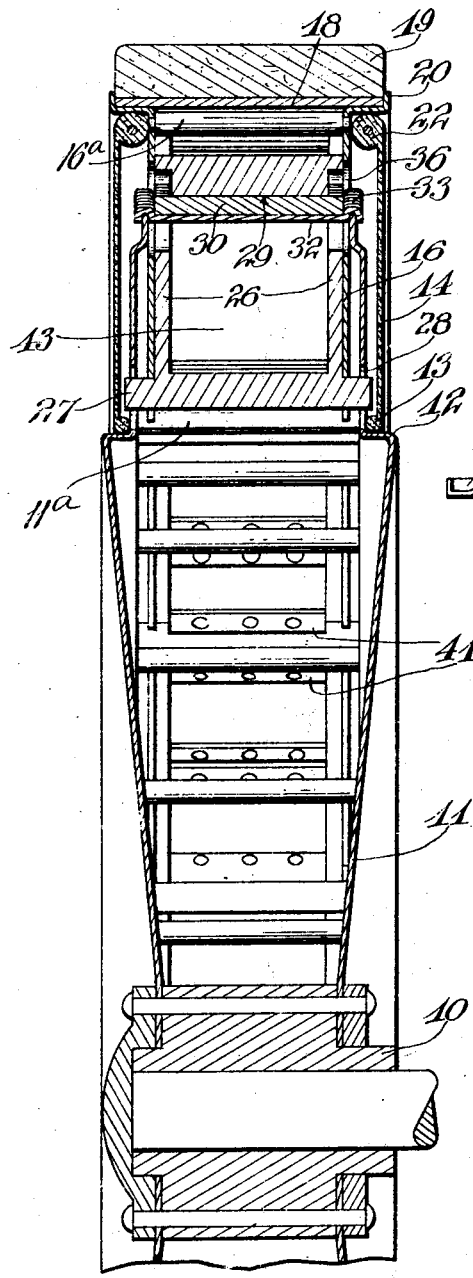
Fig. 3.
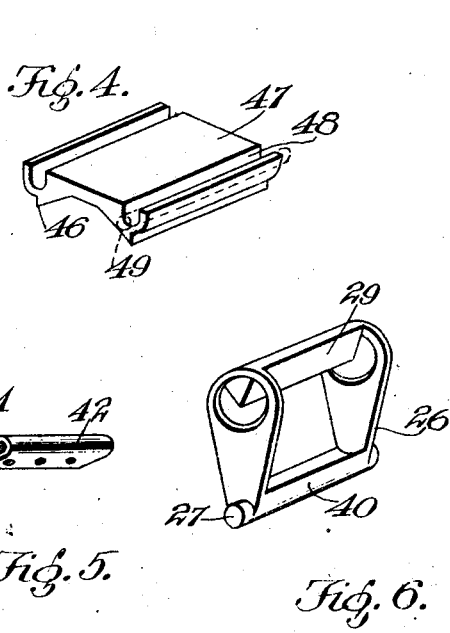
Fig. 4.
Fig. 6.
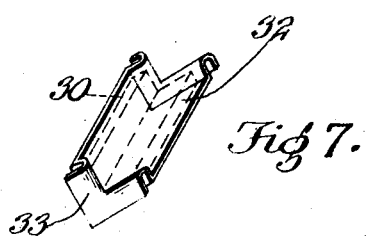
Fig 7.
Chas. B. Evans
INVENTOR
BY *Milo R. Stevens*
ATTORNEYS.

Patented June 21, 1927.

1,633,522

UNITED STATES PATENT OFFICE.

CHARLES B. EVANS, OF CHICAGO, ILLINOIS.

RESILIENT WHEEL.

Application filed October 10, 1925. Serial No. 61,789.

This invention relates to resilient wheels especially adapted for use on motor vehicles although not necessarily restricted to such use.

Briefly stated, an important object of this invention is to provide a resilient wheel wherein the tire or tread element may be solid and the resiliency provided by a novel spring arrangement between the more or less rigid central portion of the wheel and the tread element.

A further object is to provide a resilient wheel which is dust-proof, simple to assemble, and durable in use.

Other objects and advantages will be apparent during the course of the following description.

In the accompanying drawings forming a part of this application and in which like numerals are employed to designate like parts throughout the same.

Fig. 3 is a transverse sectional view through a portion of the wheel;

Fig. 4 is a perspective of an attaching block embodied in the invention;

Fig. 5 is a perspective of one of the connecting members for attaching the springs;

Fig. 6 is a perspective of a spacing element embodied in the invention;

Fig. 7 is a perspective of a cradle-like member embodied in the invention.

Figure 1:
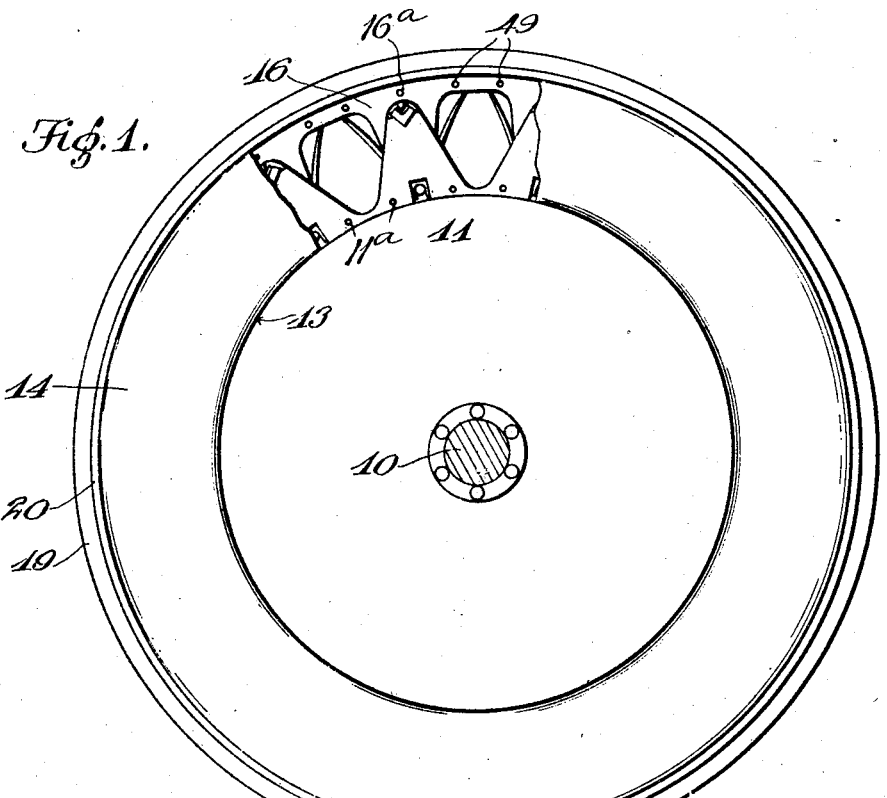
Figure 1 is a side elevation of the improved wheel, parts being broken away.

In the drawings, the numeral 10 designates a hub having substantially disk-shaped members 11 secured thereto in any suitable manner and diverging somewhat after the fashion illustrated in Fig. 3. This figure plainly illustrates that the disks 11 are offset at points spaced inwardly from their peripheries to define shoulders 12, upon which the beads 13 of flexible dust-excluding rings 14 rest. The members 11 may be joined as indicated at 11ª. Attention is especially directed to the fact that the shoulders 12 not only function as supports or rests for the beads 13, but also as strengthening and reinforcing devices for the disks.

In carrying out the invention, a pair of annuli 16 are arranged inwardly of the outer portions of the disks 11 and have their own outer edge portions offset to provide shoulders or rests for the rim 18 of a tread element 19. The annuli 16 are joined by pins 16ª, the ends of which are extended through and are riveted to the annuli 16. The tread element 19 may be of rubber or other suitable material and is limited in its lateral movement by the flanges 20 defined by offsetting the outer edge portions of the annuli 16. Fig. 3 plainly illustrates that the rim 18 is engaged by the flanges 20 and is, therefore, held against lateral movement. At this point it might be noted that the outer portions of the dust-excluding covers 14 are beaded as indicated at 22 and rest against the offsets at the outer portions of the annuli 16. In applying the dust covers 14 one of the beads of the same may first be arranged in place and the other bead may be positioned so as to hold the covers in place.

Fig. 6 illustrates a spacing element 26, a number of which are arranged between the annuli 16 and are provided with extensions 27 which are received in slots 28 in the outer edge portions of the disks 11 whereby the spacing elements 26 are held against extensive radial and circumferential movement with respect to the other parts of the wheel. The outer portions of the spacing elements are provided with fulcrum members 29 which seat in the wear plates 30 carried by angle cradle-like members 32. Fig. 3 plainly shows that the cradle-like members 32 have their ends provided with V-shaped hooks 33 which engage the outer edges of the disks 11 and thereby hold the same in uniformly spaced relation. It will be seen that the portions 29 of the spacing elements 26 are free to rock to a limited extent on the cradle-like members 32 to allow the wheel to have the desired flexibility. The end portions of the cradle-like members 32 are extended through slots 36 in the annuli 16 and by this arrangement the annuli are limited in their circumferential movement with respect to the other parts of the organization.

Figure 2:
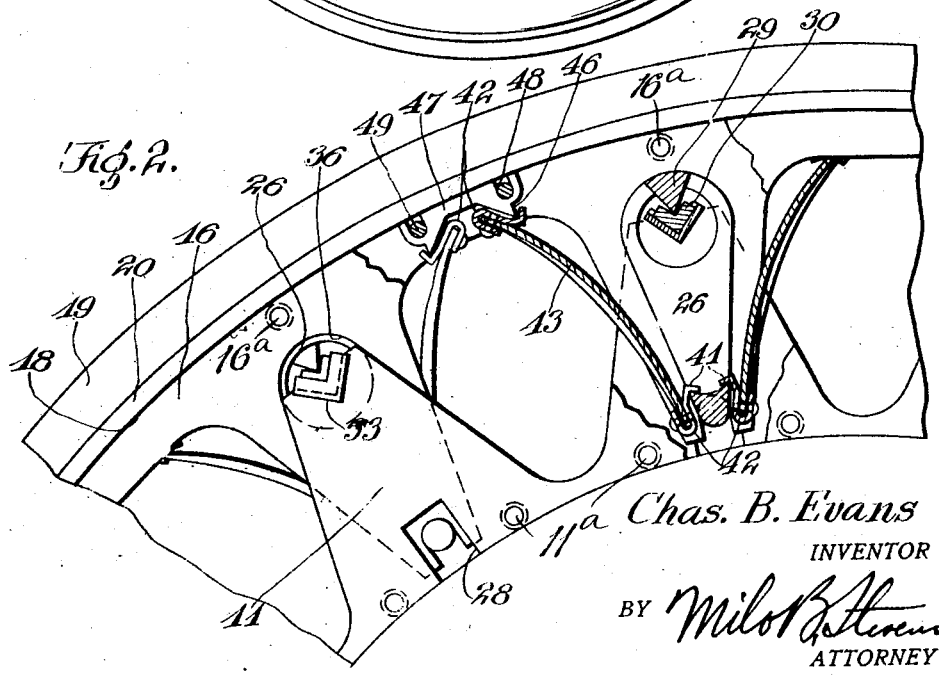
Fig. 2 is an enlarged fragmentary side elevation of the wheel, parts being broken away to illustrate the resilient support for the tread element.

The inner cross members 40 of the spacings elements 26 are provided with sharpened edges or more or less V-shaped edges for engagement by the flanges 41 of hooks 42, the hooks being riveted or otherwise securely connected to leaf springs 43. The leaf springs 43 may be curved transversely and longitudinally as shown in Fig. 2 and have their outer portions riveted or otherwise secured to additional hooks 42. The additional hooks 42 at the outer portions of the leaf springs 43 are engaged with and rock on the ribs 46 of attaching blocks 47. Fig. 4 plainly shows that the attaching blocks 47 have channels or grooves 48 for the reception of pins 49 by means of which the blocks are attached to the annuli 16.

With reference to the foregoing description taken in connection with the accompanying drawings it will be seen that the tendency of the leaf springs 43 will be to urge the spacing elements 26 inwardly toward the axis of the wheel and that shocks to which the wheel is subjected are absorbed to a high degree by the springs 43 which are located between the members 26, this feature being clearly shown in Fig. 2. The improved wheel when assembled will allow of a proper yielding action of the wheel and will, therefore, perform many of the functions of a pneumatic tire without the possibility of punctures and blow-outs. It will be seen that the arrangement provides for a limited lateral as well as radial yielding movement so that side strains are withstood with a limited degree of spring action.

Attention is directed to the dished form of the springs 43. When the springs are inserted in the wheel they are slightly bowed (see Fig. 2) this imparting to them a degree of firmness along the side edges due to the gather thereof. Thus, when the wheel encounters a shock, the further flexing of the springs is uniform along the length thereof, due to the retarding effect had by the gathered sides upon the middle portion of each spring, which would otherwise flex most, leaving the balance of the spring relatively stiff. The novel spring therefore accomplishes in one simple piece what the relatively expensive multi-leaf spring is expected to attain.

Having thus described the invention, what is claimed is:

1. A resilient wheel comprising a pair of disks having their outer portions offset to define reinforcing shoulders, a pair of annuli confined between the outer portions of said disks and having offsets defining shoulders, dust-excluding covers having beads engaged with said first and second-named shoulders, and springs having connection with said disks and said annuli.

2. A resilient wheel comprising a pair of disks having their outer portions offset to define reinforcing shoulders, a pair of annuli confined between the outer portions of said disks and having offsets defining shoulders, dust-excluding covers confined between said first and second-named shoulders, a tread element having a rim mounted on said second-named shoulders, and springs having connection with said disks and said annuli.

3. A resilient wheel comprising a pair of spaced members having their outer portions offset to define reinforcing shoulders, a pair of annuli confined between said spaced members and having offsets defining shoulders, dust-excluding covers having means engaged with said first and second-named shoulders, a tread element having a rim mounted on said second-named shoulders, the second-named shoulders being provided with flanges to limit the lateral movement of said tread element, and springs having connection with said spaced members and said annuli.

4. A resilient wheel comprising a pair of disks having offsets to define reinforcing shoulders, a pair of annuli confined between the outer portions of said disks and having offsets defining shoulders in spaced relation to said first-named shoulders, dust-excluding covers having beads engaged with said first and second-named shoulders, a tread element having a rim mounted on said second-named shoulders, the second-named shoulders being provided with flanges to limit the lateral movement of said tread element, and springs having connection with said annuli and said disks and urging said rim outwardly.

5. A resilient wheel comprising a pair of annuli having slots, a pair of disks arranged outwardly of said annuli, connecting members extending through said slots and having hooks of V-shaped formation engaging the outer portions of said disks to maintain the disks in uniformly spaced relation, and springs having connection with said annuli and said disks.

6. A resilient wheel comprising a pair of annuli having slots, a pair of disks arranged outwardly of said annuli, connecting members extending through said slots and having hooks of V-shaped formation engaging the outer portions of said disks to maintain the disks in uniformly spaced relation, spacing elements mounted on said connecting members and having extensions pivotally connected to said disks, and springs having attaching members connected to said spacing elements and said annuli.

7. A resilient wheel comprising a pair of annuli having slots, a pair of disks arranged outwardly of said annuli, connecting members extending through said slots and having hooks of V-shaped formation engaging the outer portions of said disks to maintain the disks in uniformly spaced relation, spacing elements mounted on said connecting members and having extensions pivotally connected to said disks, spring, having attaching members connected to said spacing elements, blocks connected to said annuli and having ribs, and hooks connecting said springs to said ribs.

8. A resilient wheel comprising disks, cradle members having their end portions provided with hooks connected to said disks, wear plates of angle formation received in said cradle members, spacing elements having fulcrum members seated in said wear plates, said spacing elements being provided at the inner portions thereof with cross members and pivotal extensions, said pivotal extensions being connected to said disks, a rim arranged outwardly of said disks, blocks inwardly of said rim and associated therewith, and leaf springs having attaching members connected to said blocks and said cross members of the spacing elements.

9. A resilient wheel comprising disks, cradle members having their end portions provided with hooks connected to said disks, wear plates of angle formation received in said cradle members, spacing elements having fulcrum members seated in said wear plates, said spacing elements being provided at the inner portions thereof with cross members and pivotal extensions, said pivotal extensions being connected to said disks, a rim arranged outwardly of said disks, blocks inwardly of said rim and associated therewith, leaf springs having attaching members connected to said blocks and said cross members of the spacing elements, and annuli arranged at opposite sides of said spacing elements and having slots receiving said cradle members.

10. A resilient wheel comprising disks, cradle members connected to said disks, wear plates received in said cradle members, spacing elements having fulcrum members seated on said wear plates, said spacing elements being provided with cross members and pivotal extensions, said pivotal extensions being connected to said disks, a rim arranged outwardly of said disks, blocks inwardly of said rim and associated therewith, leaf springs having attaching members connected to said blocks and said cross members of the spacing elements, and annuli arranged at opposite sides of said spacing elements and having slots receiving said cradle members, the outer portions of said annuli being offset to provide shoulders for supporting said rim.

11. A resilient wheel comprising disks, cradle members having their end portions provided with hooks connected to said disks, wear plates of angle formation received in said cradle members, spacing elements having fulcrum members seated in said wear plates, said spacing elements being provided at the inner portions thereof with cross members and pivotal extensions, said pivotal extensions being connected to said disks, a rim arranged outwardly of said disks, blocks inwardly of said rim and associated therewith, leaf springs having attaching members connected to said blocks and said cross members of the spacing elements, annuli arranged at opposite sides of said spacing elements and having slots receiving said cradle members, the outer portions of said annuli being offset to provide shoulders for supporting said rim, said disks being provided with reinforcing shoulders, and flexible dust-excluding covers having beads engaged with said first and second-named shoulders.

In testimony whereof I affix my signature.

CHARLES B. EVANS.